Patented Mar. 7, 1944

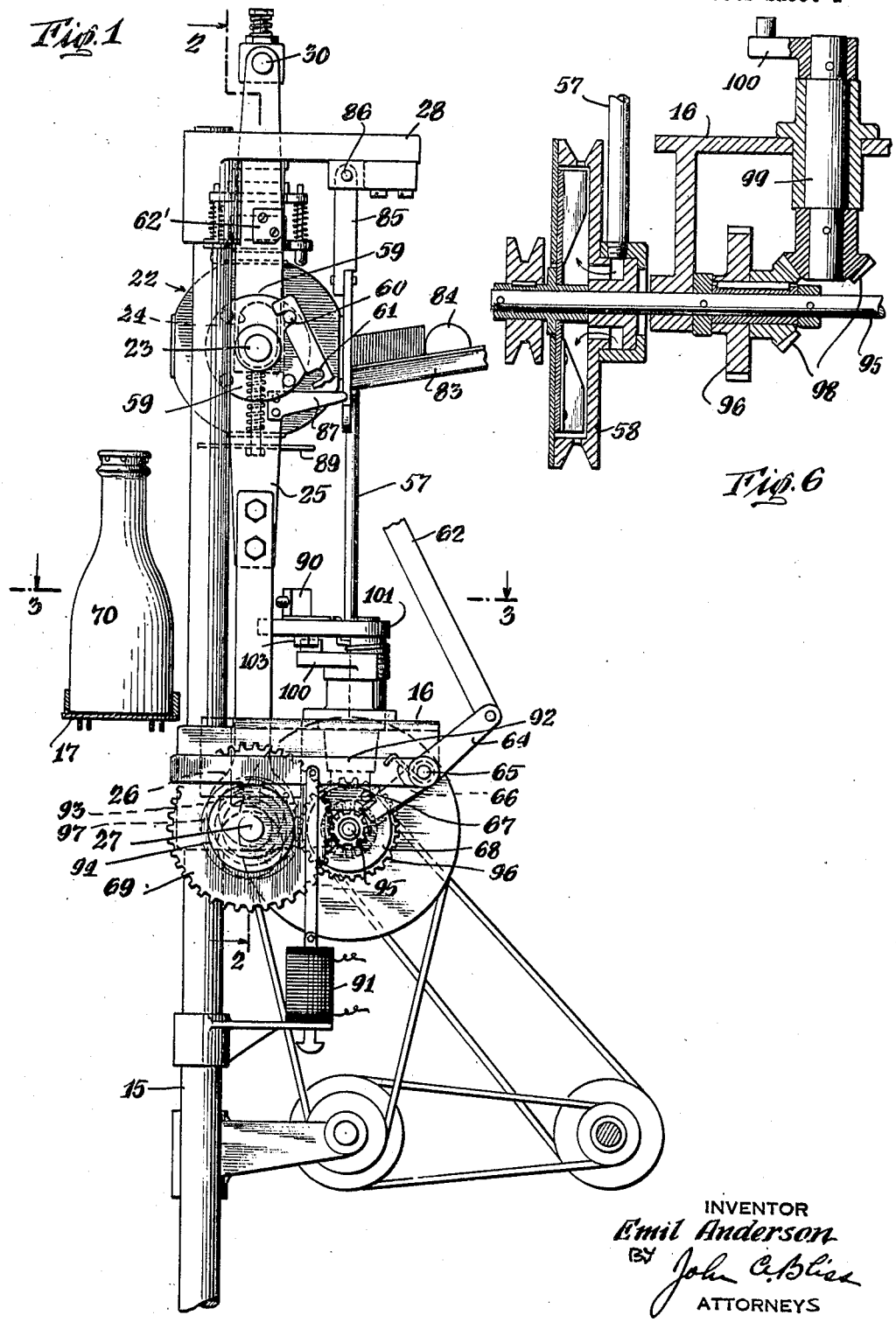

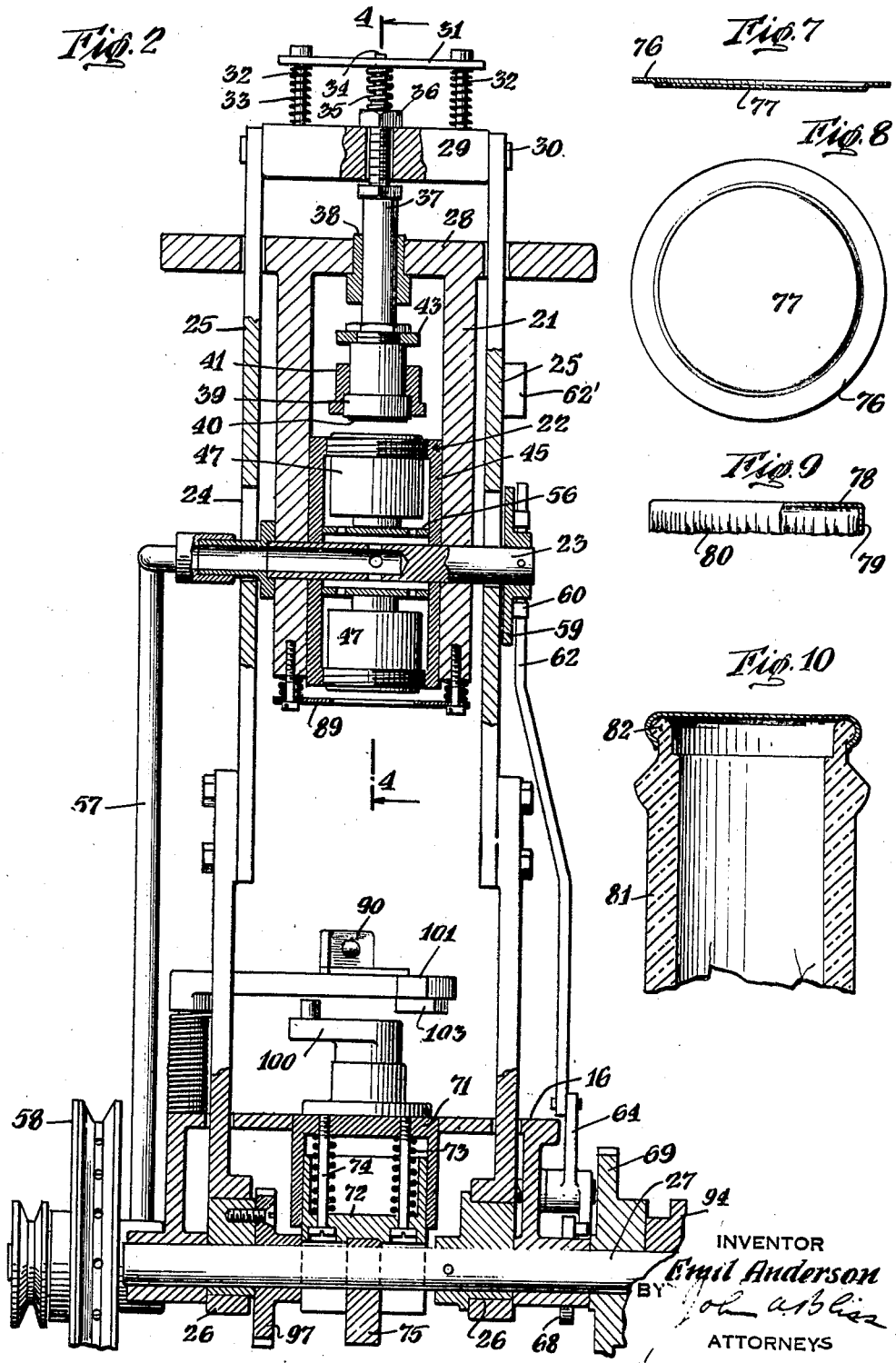

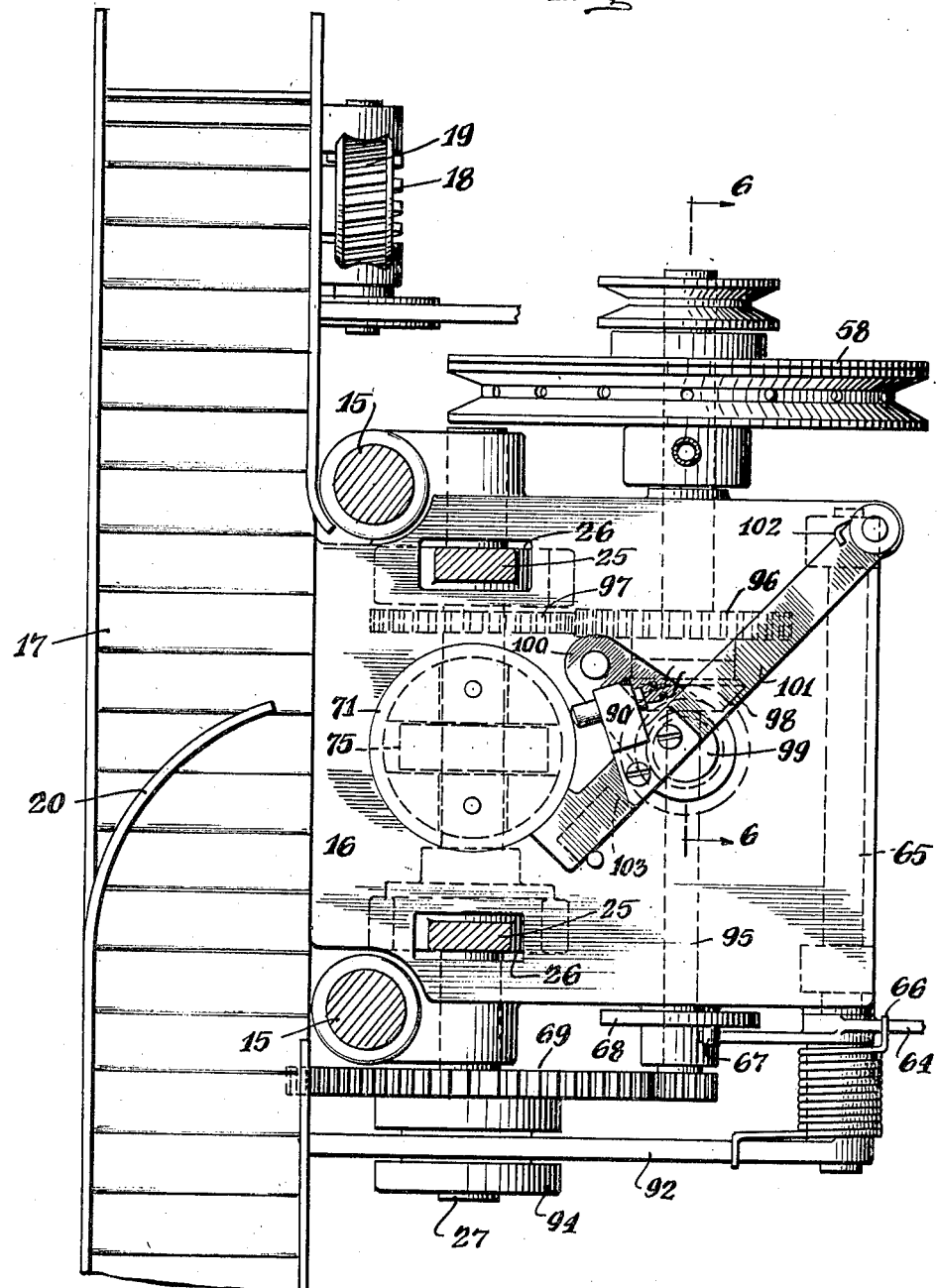

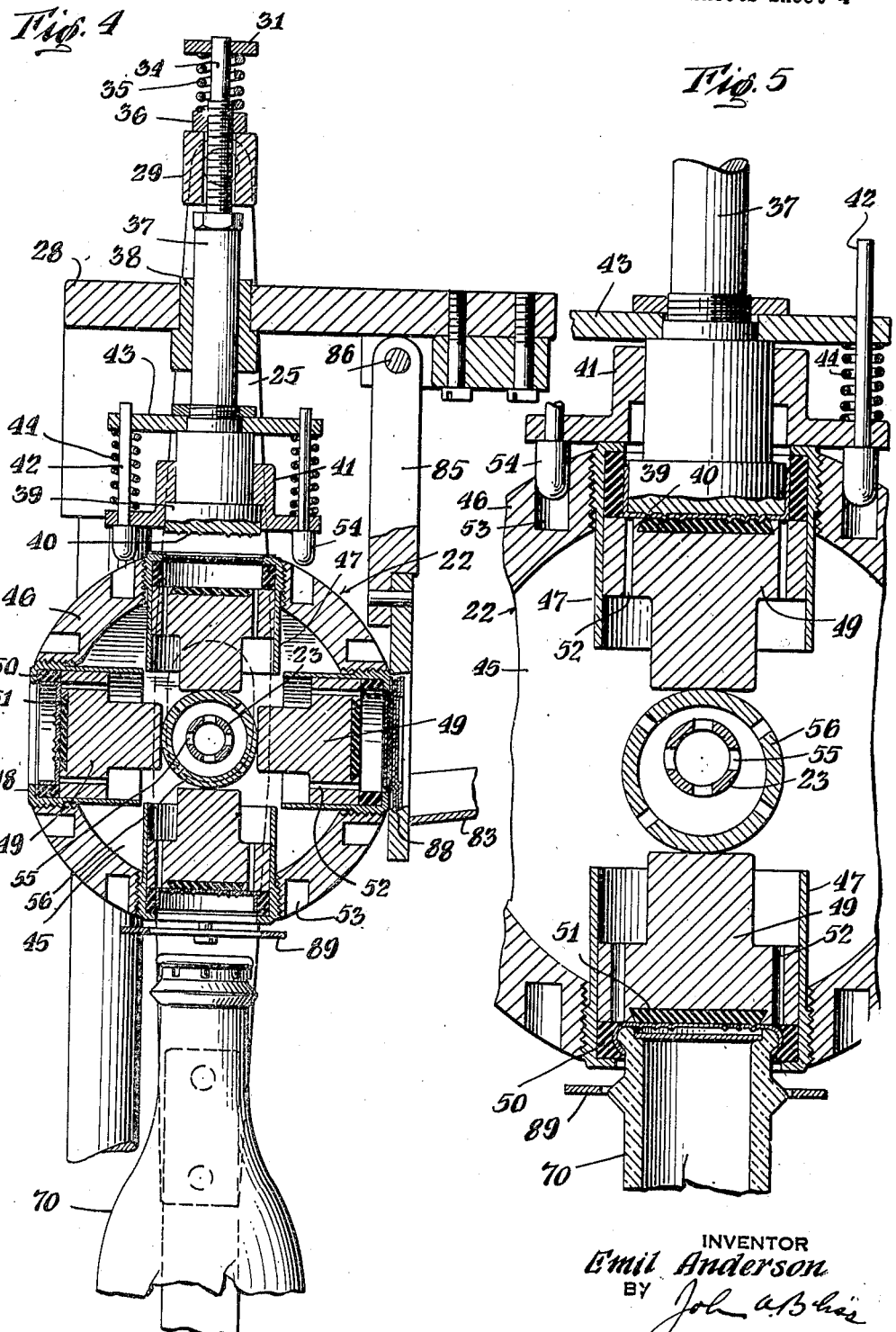

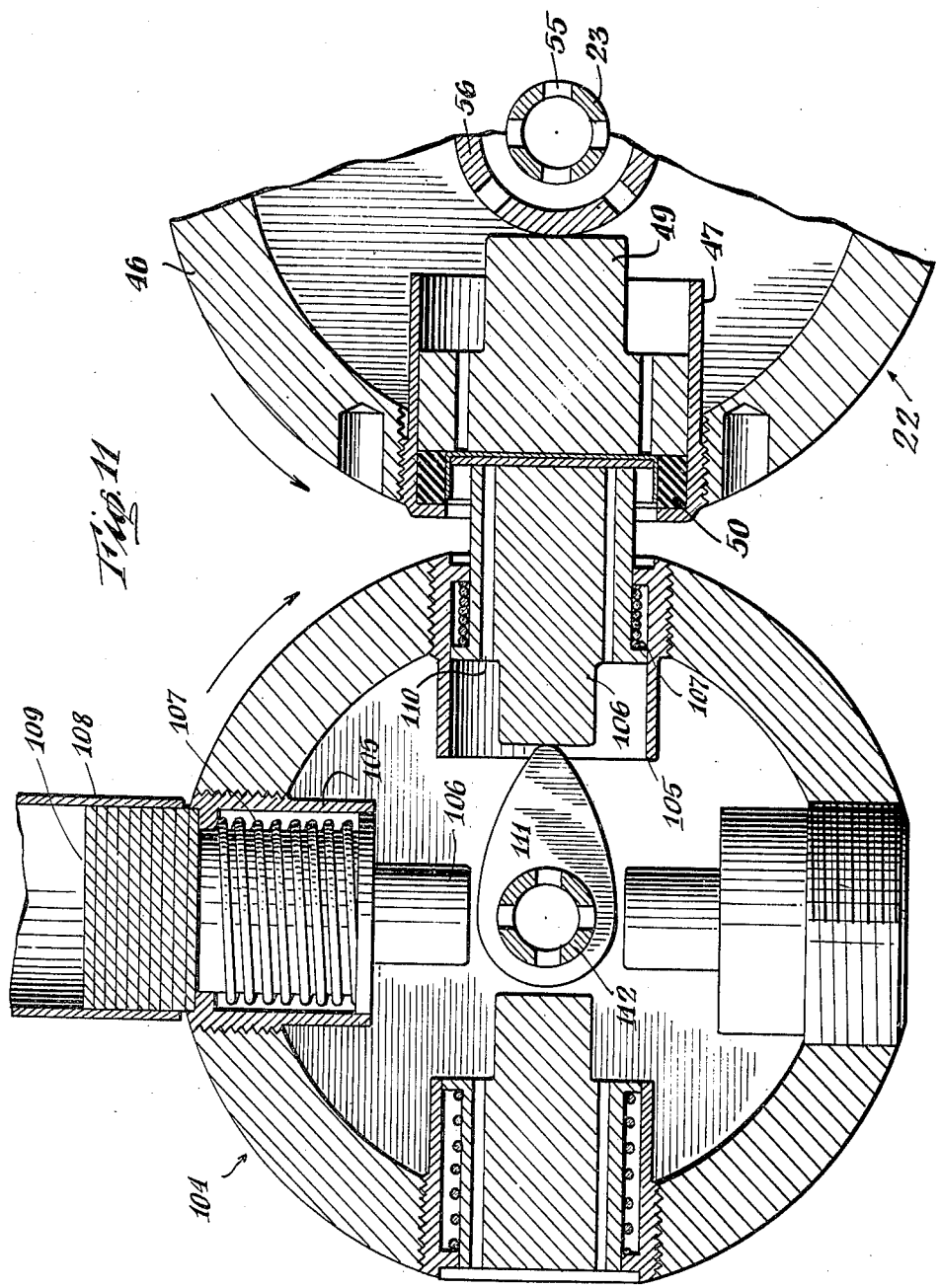

2,343,358

UNITED STATES PATENT OFFICE 2,343,358

MACHINE FOR MANUFACTURING AND APPLYING BOTTLE CAPS

Emil Anderson, Briarcliff Manor, N. Y., assignor to Reynolds Metals Company, Richmond, Va., a corporation of Delaware Application August 25, 1939, Serial No. 291,833

5 Claims. (Cl. 226—85)

It is an object of the invention to furnish a cap or closure which may be manufactured with minimum expense and in large quantities, to furnish an attractive unit readily capable of application to a receptacle and when so positioned affording a tamperproof seal.

Another object of the invention is that of constructing a closure which may be manufactured to embrace a number of styles and configurations and which may, moreover, include any desired surface indicia or ornamentation. Additionally, when in applied position, the cap will not alone prevent the entrance of foreign matter through the mouth of the receptacle, but will additionally guard the pouring-lip of the latter against contamination, and will effectively prevent the escape of fluid from within the interior of the receptacle.

Still another object is that of providing a machine which, in a simple and efficient manner, will shape or form closures constructed in accordance with the teachings of the present invention.

A further object is that of furnishing a machine which will preferably form a part of the closure-forming unit and by means of which the caps will be efficiently applied to and caused to remain in proper association with a bottle or other receptacle.

Additional objects of the invention reside in the providing of machines capable of achieving the results set forth in the last two paragraphs, and which machine will embody relatively few and simple components capable of ready assemblage to form a unitary structure operating over long periods of time with freedom from all difficulties: the present invention, moreover, contemplating the teaching of a new and improved method by means of which the desired forming and applying results are obtained.

With these and other objects in mind, reference is had to the attached sheets of drawings illustrating practical embodiments of the invention, and in which:

Fig. 1 is a side view of the forming and applying machine;

Fig. 2 is a partly sectional front view of the same taken along the lines 2—2 and in the direction of the arrows as indicated in Fig. 1;

Fig. 3 is a transverse sectional plan view taken along the line 3—3 and also in the direction of the arrows as indicated in Fig. 1;

Fig. 4 is a transverse sectional view in enlarged scale and taken along the lines 4—4 and in the direction of the arrows as indicated in Fig. 2;

Fig. 5 is a view similar to Fig. 4 and on even larger scale, the parts being shown in a different position from that which they have assumed in Fig. 4;

Fig. 6 is a view taken along the lines 6—6 and in the direction of the arrows, as indicated in Fig. 3;

Fig. 7 is a sectional view taken through a closure prior to its final formation;

Fig. 8 is a bottom plan view of the element as shown in Fig. 7;

Fig. 9 illustrates the formed closure;

Fig. 10 is a fragmentary sectional view showing the closure in applied position and Fig. 11 is a fragmentary sectional view of the head of the machine and showing a feeding head which may be associated with the same.

Referring primarily to Figs. 1–5, inclusive, the numeral 15 indicates a support which may extend from a suitable bed (not shown) and upon which the entire machine is mounted. This support primarily mounts a deck or platform 16 adjacent which a conveyor moves. The latter may be flexible and comprise a series of connected elements 17 driven in the direction of the arrows, as indicated in Fig. 3 by, for example, a worm 18 and worm wheel 19. A deflecting strap or plate 20 may extend across the conveyor adjacent the deck 16 so that as receptacles are moved by the conveyor the leading one of the same will be diverted onto the deck. Thereafter, such receptacle may again be diverted to the conveyor to be disposed of as desired.

Support 15 also extends above the platform 16 to mount a head. The latter, as illustrated especially in Fig. 2, includes a pair of side members 21 between which a turret or annular member 22 is rotatably mounted by being affixed, for example, to a shaft 23. This shaft extends through slots 24 formed in actuating bars 25 and the latter are connected to cams or cranks 26 affixed to a drive shaft 27 so that as the latter rotates bars 25 are reciprocated. These bars also extend through openings formed in the piece 28 which connects the side members 21 adjacent the upper ends of the latter. The bars 25 are at a point above element 28 connected as at 29, by means of a cross bar which is pivotally coupled to the same, by means of stub shafts 30. Strap 31 may be supported above bar 29 by being mounted upon bolts 32, which have one of their ends coupled to bar 29, their bodies being encircled by springs 33. Centrally disposed of strap 31 is a pin 34, the body of which extends through bar 29 and is slidable with respect to the same. A spring 35 encircles pin 34 and engages against a nut 36 mounted upon the same. Accordingly, this pin is constantly urged inwardly but is capable of shifting under any sudden shocks so that damage will not occur to the parts. Below the bar 29, pin 34 is continued in the form of a plunger 37, which extends slidably through a bushing 38, mounted upon cross piece 28. The plunger terminates in an enlarged head 39, having elevated portions 40, formed in its inner face. These portions may be of a nature such as to provide for indicia or surface ornamentation in the face of the cap. The head 39 is encircled by a collar 41 which is slidably supported, incident to being mounted, upon pins 42 which extend through openings in a guide 43 mounted by the plunger 37. Springs 44 encircle pins 42 and constantly urge the collar 41 downwardly.

Now with regard to the turret or head generally indicated at 22, it will be observed that this element conveniently includes side walls 45 connected by a peripheral portion 46. As illustrated, the turret is formed with four openings in its periphery, it being obvious that a greater or lesser number of openings might be employed. Within each of these openings a socket member is mounted, and each of these socket members is conveniently in the form of a tube 47, having an inwardly extending flange 48 adjacent its outer end and within which a plunger 49 is mounted for reciprocation. Interposed between the flanges 48 and the plungers are ring shaped elements 50, preferably of rubber. Moreover, each of the outer faces of the plungers 49 may have inset into it a rubber disk or layer 51.

It is apparent, in connection with the latter layer or cushion, that upon the plunger 49 being projected, ring 50 will be caused to bulge outwardly as especially indicated in the lower portion of Fig. 5. Also, each of the plungers is formed with apertures or passages 52 through its head, in order that fluid may flow through the same, and it will finally be noted that the periphery 46 of the turret is formed with recesses 53.

These recesses are in the form of pairs to each side of the tubes 47. Co-operating with these recesses are the heads 54 of the pins 42 and which cam against the edges of the openings in order to assure a centering of the parts. It is also to be noted that the shaft 23 is formed with perforations 55 and is encircled by a similarly perforated sleeve 56, which is supported between and contacted by the inner ends of the plungers 49.

Shaft 23 is formed with a bore connected by a tube 57 with a vacuum pump 58. The latter may be coupled to shaft 27. Turret 22 is caused to be intermittently rotated or indexed as, for example, by a disk 59 secured to shaft 23 and formed with a series of pins 60 engageable by the notch 61 formed in a rod 62. As rod 62 is moved upwardly, its upper end engages stop 62' laterally which disengages the appropriate pin 60 from notch 61. Rod 62 has its inner end coupled to a lever 64 pivotally mounted as at 65, and with which a spring 66 is associated. In turn, the lever may have its inner end rocked by a pin 67, secured to a disk 68 and which is driven by a gear connection 69 from shaft 27. Thus, it is obvious that each time disk 68 rotates, lever 64 will be rocked so that through bar 62 the turret 22 will be indexed or advanced through a 90° arc.

Additionally, with reference to this portion of the machine, it will be noted that platform 16 is formed with an opening adjacent that station which receives the bottle 70. Mounted to normally extend flush with the upper face of the deck is a cup shaped member 71, which rests upon a base member 72, and in fact may be telescopically disposed with respect thereto. Springs 73 encircling bolts 74 may provide for a yielding coupling between these elements, and this coupling may be amplified by the pneumatic cushioning which may be furnished incident to the relationship of the parts. A cam 75 is affixed to shaft 27 and co-operates with the base 72 so as to project the same once during each revolution of the shaft. Now considering the cap or closure which is provided in accordance with teachings of the present invention, attention is primarily directed to Figs. 7 and 8, in which the numeral 76 indicates a disk preferably formed of metal foil and having a centrally depressed portion 77. This disk—as will hereafter appear—might be shaped in this manner within the present machine. It is preferred, however, that it be preformed to this extent before it is fed to the machine. In any event, however, this disk is shaped within the machine, as shown in Fig. 9, to provide an upper layer 78 having a downwardly extending skirt 79 which may be formed with crimps 80. This in itself provides a closure, which, when applied to the neck 81 of a receptacle or bottle, encloses the pouring-lip 82 of the same and may be caused to have its skirt portion brought into intimate contact with the bottle neck at a point immediately beyond the pouring-lip and so that the closure cannot be accidentally displaced. In fact, it will be apparent, in order to obtain access to the contents of the receptacle, it will be necessary to remove the closure which will result in a deformation of the latter and particularly the skirt portion thereof, so that even a casual observer would be cognizant that the closure had been removed, in the event that someone attempted to re-apply the same.

Now conceding that a number of disks, such as shown in Figs. 7 and 8, are disposed within the magazine chute 83, it is apparent that they tend to feed downwardly within the latter and towards the turret 22 incident to the action of gravity. Of course, a spring follower 84 may be employed but, in any event, it is preferred to mount the magazine on a rod 85 which is pivotally suspended as at 86, from the cross piece 28. It is also preferred that one of the bars 25 mount an extension 87, which contacts with the end of bar 85. Additionally, and as shown especially in Fig. 4, the bar is provided with an opening co-extensive with chute 83, and a groove 88 may be formed in this bore. Thus, it is apparent that if then the bars 25 reciprocate, the magazine will be oscillated to cause a positive feeding of the closure disks towards the turret 22. Therefore, the innermost closure disk will come to rest within groove 88 and be transferred from the same to lie in contact with the outer face of that socket member which is in line with the opening formed through bar 85.

Assume now that the turret 22 is indexed through 90°, it will be apparent that as bars 25 are moved downwardly, head 39 is similarly moved. Additionally, collar 41 will engage the peripheral portion 76 of the disk with a greater or lesser degree of intimacy and according to the compression of springs 44. Simultaneously, the heads 54 of pins 42 enter openings 53, in order to assure a proper centering of the parts.

Continued inward movement on the part of plunger 37 and head 39 will cause indicia to be imposed upon the central portion 77 of the disk as the elevations 40 intimately engage the latter. According to the clamping effect exerted by collar 41, the creases or corrugations formed in the peripheral portion of the disk will be emphasized or flattened to a greater or lesser extent. In fact, if the force exerted by the collar is sufficient, the skirt or flange will present—in effect—a single layer of material in that, due to the general characteristics of the metal and the action, the closure will be drawn into shape. In any event, however, the disk will be projected into the opening and the skirt member will be drawn to have the general configuration illustrated in Fig. 9.

It will be understood that as the disk is transferred from the bore of bar 85 to the turret, it is maintained against displacement incident to the suction effect resulting from pump 58 and which is transmitted through tube 57, the interior of shaft 23 and the openings of collar 56 to passages 52. This suction effect will continue at the station adjacent which plunger 37 acts and will, of course, maintain the closure in position adjacent the succeeding station.

Adjacent the lower station, the bottle 70 has been positioned upon member 71 by being transferred from the conveyor. Cam 75 will act to elevate this member and the bottle will be elevated so that the mouth of the receptacle will be projected through a spring supported guiding and centering ring 89 and come to rest within the outer end of the adjacent socket member, as shown in Fig. 5.

Now, it is to be remembered that as plunger 37 was projected to draw the closure, the adjacent plunger 49 was similarly projected as shown in Fig. 5. Thrust, accordingly, was transmitted to ring 56 and the latter, incident to its engagement with the inner end of the diametrically opposed plungers, serves to project this element. Consequently, the resilient ring 50 is compressed and caused to bulge inwardly. This will cause the skirt of the closure to be intimately engaged and constricted around and below the pouring-lip of the bottle so that a complete closure, such as is illustrated in Fig. 10, results.

Now considering the control of the machine and feeding of the receptacles, it has heretofore been noted that the latter are diverted onto platform 16 and properly centered with respect to the head. As shown especially in Fig. 3, there is provided adjacent the receiving station of the receptacle a circuit closure 90 which is actuated by being engaged by the wall of the receptacle. This closure controls the operation of a solenoid 91, as shown in Fig. 1 and which rocks a lever 92. This lever has a lug or projection 93 controlling the operation of a clutch 94, associated with shaft 27. As a consequence of this construction, it is apparent that as a receptacle assumes a proper position upon the deck, the solenoid will be actuated and shaft 27 will be permitted to rotate through one revolution. This will result in the sequence of operation heretofore described.

A shaft 95 extends parallel to shaft 27 and rotatably mounts a gear 96 which is driven from a gear 97 affixed to shaft 27. This gear, as shown in Fig. 6, rotates through a beveled drive 98, a shaft 99. The latter terminates in a crank 100 disposed above the deck of the machine. Also extending above the deck of the machine is an arm 101, which is the arm supporting the contact maker 90. This arm is capable of oscillation and normally shifts to the position shown in Figs. 1 and 3, under the influence of a spring 102. The arm presents an abutment 103, capable of being engaged by the pin carried by crank 100. Thus, it is apparent that each time the crank rotates, the arm will be oscillated, first against the tendency of spring 102 and then after the crank pin clears the abutment 103, the arm will be free to return to its initial position.

It follows that the receptacle will be displaced by the arm back onto the conveyor at a point beyond the deflector 20, and this transfer will occur after the cap applying operation. It will additionally be understood that in lieu of the "single-rotation" type of clutch herein provided and the control for the same, any other suitable mechanism might be employed. However, and as afore brought out, the closure is formed and simultaneous surface ornamentation may be applied thereto. Such ornamentation may be in the form of the dairyman's name and address, the date etc. After such formation, the closure is applied to the receptacle and the sealed bottle is delivered in any desired manner.

In certain instances, it might be desired to associate with the closure, a liner having one of a number of different configurations and characteristics to provide against contamination of the contents of the receptacle and/or to prevent a leakage of the same. Where such a function is desired, it is preferred that the desired element be associated with the cap at the turret station which is intermediate the forming and applying stations and a structure suitable for use in this connection has been shown in Fig. 11.

In this view, the turret, generally indicated at 22, has been identified by the same numbers which have heretofore been employed. Adjacent such turret or head, a second and similar element 104 is suitably mounted. This is rotated by a connection (not shown) in the direction indicated by the arrow. The head presents a series of radial tubes or sockets 105 mounting, plungers 106 which are spring pressed inwardly as indicated at 107. A magazine 108 may house a number of disks or corresponding sealing elements 109, and the latter may be induced to move towards the unit 104 by any suitable means. A source of suction (not shown) acts through passages 110 to cause one of the elements to remain in association with that plunger which is adjacent the magazine. The inner ends of the plungers may be contactable by a cam 111 mounted upon a shaft 112 driven in synchronism with the movements of turret 22.

Consequently, a structure is presented such that one of the elements 109 is transferred to a position adjacent the formed cap and, prior to the application of the latter to a bottle, such element is placed within the base of the cap to achieve the desired results.

In other words, in common with the structure shown in Figs. 1–11, the disks, or partially formed blanks, are transferred from the magazine to the tubes and are maintained in the latter association by virtue of the vacuum or any other equivalent expedient. Thereafter, they are shifted to the forming station where the plunger exerts a "drawing" effect, such that a skirted closure is provided. As will also be observed, especially in Fig. 5, major force may be exerted at this station, in order to indent the caps, while simply employing as a base portion, thereafter, the rubber insert associated with the plungers 49. This action will result in no damage to the parts because the force is cushioned incident to the transference of thrust from the plunger 49 in line with the head 39 to the plunger which overlies the neck of the bottle. Thus, the resilient element, associated with the latter plunger, is compressed because of this force, to crimp the closure and permanently associate the same with the receptacle, and this action will cushion the movement of the parts.

At the station intermediate these latter stations, a structure, having the functional characteristics of that shown in Fig. 11, may be employed to effect an application of a sealing member of any desired type to the formed cap. Such application may simply be in the nature of depositing a liner within the cap or may include any other steps to effect a more or less permanent association of these elements.

At the cap applying station, it has heretofore been noted, that the cap is crimped and applied to the receptacle. It is also again to be noted that the latter is properly centered and cushioned against shocks and especially end thrusts. Also, the vacuum exerted, while adequate to maintain the blank and closure in proper position, is not sufficiently great to interfere with a transfer of the cap to the receptacle. In fact, any desired structure may be employed to either render the vacuum inoperative at this station or to supplement the ejecting action of the plunger 49.

From the foregoing, it will be appreciated that, among others, the several objects of the invention, as specifically aforenoted, are achieved. Obviously numerous changes in construction and rearrangement of the parts might be made without departing from the spirit of the invention. Also, it is apparent that the sequence of the steps might be varied in numerous particulars.

I claim:

1. An apparatus of the character described for forming and applying closures, including a turret presenting a plurality of openings, tubes co-extensive with said openings and adapted to maintain closures therein, plungers slidably mounted within said tubes, a shaft for mounting said turret, a collar loosely encircling said shaft and contacting said plungers whereby when one of said plungers is retracted a second of the same will be projected, a forming plunger disposed adjacent said turret, means for causing said plunger to be sequentially projected into said tubes and means associated with said tubes whereby a constriction of said closure may be achieved.

2. An apparatus of the character described, including a turret presenting a plurality of openings, tubes co-extensive with said openings, plungers slidably mounted within said tubes, a shaft for mounting said turret, a collar loosely encircling said shaft and contacting said plungers whereby when one of said plungers is retracted a second of the same will be projected, a forming plunger disposed adjacent said turret, means for causing said plunger to be sequentially projected into said tubes and a resilient and constrictible means disposed adjacent the outer ends of said tubes and expandable inwardly into the same in response to movements of said plungers within said tubes.

3. An apparatus of the character described including a turret formed with a plurality of radially extending openings, a magazine disposed adjacent said turret, means adapted to transfer blanks from said magazine to one of said openings, cap forming means also disposed adjacent said turret and comprising a die and drawing means to convert said blanks into skirted caps, resilient means disposed within said openings and co-operative with said die to support said blank and cap, means also disposed adjacent said turret and subsequently co-operative with said openings to apply a liner to said formed caps, and final means associated with said turret for applying said caps to receptacles disposed adjacent said turret.

4. An apparatus of the character described for forming and applying cap-like closures, including a turret presenting a plurality of openings, tubes coextensive with said openings and adapted to receive closure blanks, vacuum means for inducing a vacuum within said tubes for holding the closure blanks in position, a closure shaping plunger, opposed plungers adapted as abutments for the cap shaping plunger slidably mounted in said tubes, a shaft for mounting said turret, and means contacting all of said plungers whereby movement of one of the plungers in a given direction will effect movement of an opposed plunger in an opposite direction.

5. An apparatus of the character described for forming and applying cap-like closures including a turret, presenting a plurality of openings, tubes coextensive with said openings and adapted to hold said closures, plungers for forming and applying said closures, the applying plungers being opposed and slidably mounted within said tubes, a shaft for mounting said turret and a collar loosely encircling said shaft and contacting with said applying plungers, the collar being movable with and by opposed plungers whereby when one of said applying plungers is retracted in a closure forming stroke of the forming plunger, one of the opposed applying plungers will be projected by the movement of said collar and will thereby be effective to apply a formed closure underlying the same.

EMIL ANDERSON.